(12) United States Patent
Williams (10) Patent No.: US 8,079,613 B2
(45) Date of Patent: Dec. 20, 2011

(54) HITCH PIN SECURING SYSTEM FOR RECEIVER MOUNTED ASSEMBLIES

(76) Inventor: Marty Williams, Colorado Springs, CO (US)

( * ) Notice: Subject to any disclaimer, the term of this patent is extended or adjusted under 35 U.S.C. 154(b) by 191 days.

(21) Appl. No.: 11/382,917

(22) Filed: May 11, 2006

(65) Prior Publication Data

US 2007/0262563 A1 Nov. 15, 2007

(51) Int. Cl.
*B60D 1/02* (2006.01)
(52) U.S. Cl. ............... 280/515; 280/491.5; 280/506; 280/507; 403/322.4
(58) Field of Classification Search ............ 280/515, 280/506, 507, 511, 491.2, 491.5; 403/322.4, 403/325
See application file for complete search history.

(56) References Cited

U.S. PATENT DOCUMENTS

| | | | | |
|---|---|---|---|---|
| 2,132,284 A | * | 10/1938 | Bonham | ............... 411/342 |
| 2,613,243 A | * | 10/1952 | Frear | ............... 439/806 |
| 3,604,304 A | * | 9/1971 | Botting | ............... 411/343 |
| 4,864,983 A | * | 9/1989 | Breitbarth | ............... 123/90.61 |
| 5,052,320 A | * | 10/1991 | Cremer | ............... 114/146 |
| 5,118,233 A | * | 6/1992 | Mitchell | ............... 411/5 |
| 5,423,566 A | | 6/1995 | Warrington | |
| 5,593,172 A | | 1/1997 | Breslin | |
| 5,735,539 A | | 4/1998 | Kravitz | |
| 5,879,102 A | | 3/1999 | Koliopoulos | |
| 5,988,667 A | | 11/1999 | Young | |
| 6,010,049 A | | 1/2000 | Stein | |
| 6,010,143 A | | 1/2000 | Stein | |
| 6,010,144 A | | 1/2000 | Breslin | |
| 6,105,989 A | | 8/2000 | Linger | |
| 6,409,203 B1 | | 6/2002 | Williams | |
| 6,481,740 B1 | * | 11/2002 | Haase et al. | ............... 280/511 |
| 6,481,913 B2 | * | 11/2002 | Chen | ............... 403/83 |
| 6,609,725 B1 | | 8/2003 | Williams | |
| 6,773,200 B2 | * | 8/2004 | Cole | ............... 403/378 |
| 6,945,550 B2 | | 9/2005 | Williams | |
| 7,338,065 B1 | * | 3/2008 | Clausen | ............... 280/507 |
| 2003/0210952 A1 | * | 11/2003 | Hsiao | ............... 403/322.4 |
| 2005/0089362 A1 | * | 4/2005 | Lin et al. | ............... 403/314 |
| 2005/0236811 A1 | * | 10/2005 | Williams | ............... 280/507 |

\* cited by examiner

*Primary Examiner* — Joanne Silbermann
*Assistant Examiner* — Maurice Williams
(74) *Attorney, Agent, or Firm* — Apex Juris, pllc; Tracy M. Heims (57) ABSTRACT

A hitch pin securing system for receiver mounted accessories. The present invention provides a device for securely clamping a shank tube to a receiver tube. This securing device minimizes the rattling and relative movement of the shank tube and the receiver tube due to the clearance between the shank tube and the receiver tube. The securing device includes a threaded nut or bushing mounted within the shank tube. A hitch pin is inserted through the receiver tube and shank tube and engages the shank tube nut. A locking handle is used to tighten the hitch pin relative to the shank tube nut. Once the hitch pin is tight, the handle is pivoted relative to the hitch pin to cause a cam surface to tighten the shank tube nut against the shank tube which forces the shank tube in tight engagement against the receiver tube.

6 Claims, 6 Drawing Sheets

HITCH PIN SECURING SYSTEM FOR RECEIVER MOUNTED ASSEMBLIES

FIELD OF THE INVENTION

This invention relates to the field of securing devices for receiver hitch assemblies and particularly to the field of securing devices that minimize the relative movement between the receiver and shanks of such assemblies.

BACKGROUND OF THE INVENTION

Many vehicles today are equipped with receiver-type trailer hitches. These types of trailer hitches typically are a square tube, normally 1¼ or 2 inches internal height and width, attached to the undercarriage of the vehicle. A second tube acts as a shank and includes outer dimensions slightly smaller than the internal dimensions of the receiver tube is slidable within the receiver tube. The shank tube is connected to the receiver tube by a pin inserted through the two tubes and locked or clipped to prevent relative movement between the two tubes.

The shank tube may include a standard ball-mount for engaging with the hitch of a trailer or other wheeled vehicle. Another popular use for receiver hitches is the use as a coupling device for installing equipment racks onto the vehicle. Bicycle carrier racks, ski carriers, storage boxes and other types of carriers have been designed to use the above-described second tube to engage within a receiver hitch tube. This provides a universal system that allows a vehicle user to be able to use various trailers and carriers with a single coupling system.

A particular problem with the use of these receiver coupling systems is the clearance between the internal dimensions of the receiver tube and the external dimensions of the shank tube. These tubes by necessity must have sufficient clearance to be able to be easily telescoped together. However, this clearance between the two tubes causes relative movement between the two tubes. The shank tube tends to rattle or chatter within the receiver tube. This rattle or chatter is at best an annoyance and at worst can distract the driver or cause damage to the trailer or the carrier.

There have been a number of attempts to solve this problem in the past. These attempts all required the use of specially designed receivers, shanks, or accessories in order to reduce the rattle between the receiver and shank. Examples of these prior attempts are disclosed in U.S. Pat. No. 5,423,566; U.S. Pat. No. 5,593,172; U.S. Pat. No. 5,735,539; U.S. Pat. No. 5,879,102; U.S. Pat. No. 5,988,667; U.S. Pat. No. 6,010,049; U.S. Pat. No. 6,010,143; U.S. Pat. No. 6,010,144; and U.S. Pat. No. 6,105,989. These prior devices either require specially designed receivers and shanks or use extraneous mounting devices to minimize the rattle between the receiver and the shank.

Another existing system for minimizing the movement and rattle between a receiver tube and shank tube is the Silent Hitch Pin by Let's Go Aero, Inc. as described in U.S. Pat. Nos. 6,409,203; 6,609,725; and 6,945,550 and in U.S. Published Application 20050236811. This system uses a resilient nut mounted within the receiver tube. The hitch pin includes a threaded portion which engages the resilient nut to secure the shank tube against the receiver tube to minimize the relative movement and rattle between the receiver tube and shank tube. These systems work well but often require tools to tighten the hitch pin with the resilient nut.

There presently is a need for a device that will minimize the rattle between the receiver tube and the shank tube. There is a further need for a device that can be used with most of the existing receiver systems presently in use. There is also a need for a device that can be securely tightened without the need of tools.

SUMMARY OF THE INVENTION

The present invention solves these and other problems by providing a device for securely clamping a shank tube to a receiver tube. This securing device minimizes the rattling and relative movement of the shank tube and the receiver tube due to the clearance between the shank tube and the receiver tube.

The present invention, in a preferred embodiment, solves these problems by providing the securing device for use not only in original equipment installations but also for use as an "after market" device that can be installed by a user in most receiver assemblies.

In a preferred embodiment of the present invention, the securing device includes a spring nut assembly. The spring nut assembly is inserted within the internal cavity of the shank tube until the nut is aligned with opposing side holes in the side walls of the shank tube. The spring maintains the nut in alignment with the opposing side walls.

The securing device also includes a hitch pin assembly as well. The hitch pin includes a threaded portion that engages the spring nut assembly. The shank tube is inserted into the receiver tube until the opposing side holes of the shank tube are aligned with opposing side holes in the receiver tube. The hitch pin is then inserted through the side holes of the receiver tube and the shank tube until the threaded portion of the hitch pin engages the nut mounted within the shank tube. The hitch pin is then rotated relative to the nut to clamp the shank tube against the receiver tube.

A lock or clip can be attached to the end of the hitch pin to prevent accidental or unauthorized removal of the hitch pin from the receiver assembly. A bushing can also be used over the reduced diameter portion of the hitch pin after it engages the nut.

Other embodiments of the present invention include using an elastomer in place of the spring on the spring nut assembly. Also, the nut may be held in alignment with the opposing side holes by adhesives, welding or other fastening techniques. One of the side holes may also be threaded instead of using a nut.

The present invention provides a mechanism for ensuring the hitch pin is securely tightened with respect to the nut without the need for tools. The hitch pin secures the shank tube tightly against the receiver tube to minimize any relative movement between the shank tube and receiver tube.

In a preferred embodiment of the present invention the hitch pin includes a locking handle that is pivotable relative to the hitch pin. The locking handle includes cam surface so that as it is pivoted downward, the cam surface forces the shank tube nut against the shank tube which in turn forces the shank tube against the receiver tube. This limits the relative movement between the shank tube and the receiver tube.

The present invention in a preferred embodiment uses a resilient member with the locking handle. The resilient member may be a spring, an elastomer bushing, an elastomer shank tube nut, an elastomer cam surface on the locking handle or any other type of resilient member that enables the cam surface to tighten the shank tube nut against the shank tube.

The locking handle of a preferred embodiment of the present invention includes a telescoping handle portion. This provides additional leverage for tightening the hitch pin relative the shank tube nut as well as for engaging and locking the handle cam surface relative to the hitch pin.

These and other features will be evident from the ensuing detailed descriptions of preferred embodiment and from the drawings.

DETAILED DESCRIPTION OF PREFERRED EMBODIMENTS

A preferred embodiment of the present invention is illustrated in FIGS. 1-5. It is to be expressly understood that the descriptive embodiment is provided herein for explanatory purposes only and is not meant to unduly limit the claimed inventions. The preferred embodiment of the present invention is intended for use with receiver hitch systems including trailer mounts as well as carriers. The preferred embodiment may be used for original equipment installations and as an after market item.

Figure 1:
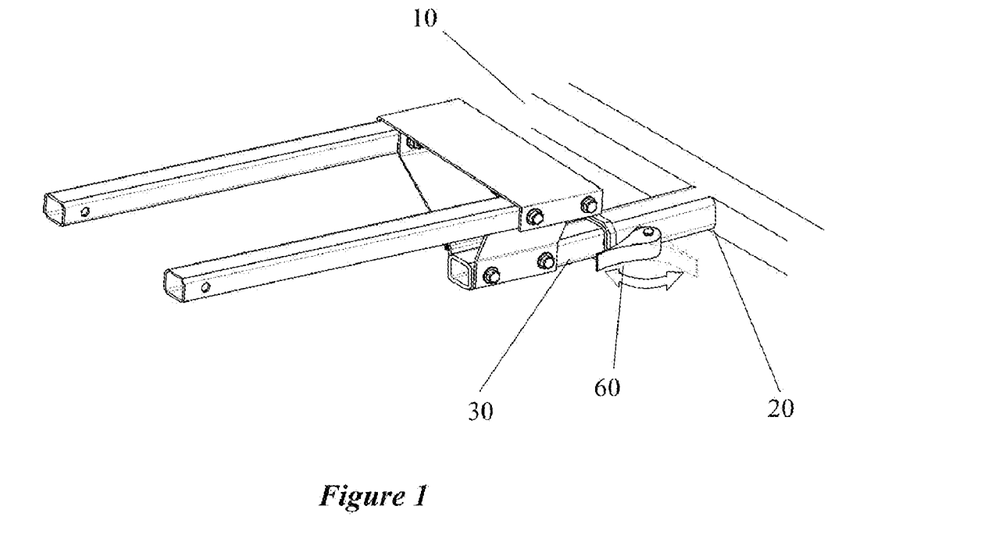
FIG. 1 is a perspective view of a receiver mounted accessory system.

In the preferred embodiment, shown in FIG. 1, receiver hitch assembly 10 includes receiver tube 20 mounted beneath a bumper of a vehicle. Receiver tube 20 is mounted to the vehicle by well known mounting techniques, such as by bolting or welding. In this preferred embodiment, receiver tube 20 includes either 1¼ inch square tubing or 2 inch square tubing (internal dimensions). It is to be expressly understood that other sizes or shapes of tubing can be used as well.

The present invention allows users to install the securing device of the preferred embodiments without the need for special tools or modification of the receiver assemblies. The securing device of the present invention may be used with any number of hitch pin assemblies. It is described for use with a spring nut hitch pin assembly, such as the hitch pin assemblies described in U.S. Pat. Nos. 6,945,550; 6,609,725 and 6,409,203, all of which are incorporated herein by reference. This description of those hitch pin assemblies are for descriptive purposes only and are not meant to limit the present invention.

Figure 5:
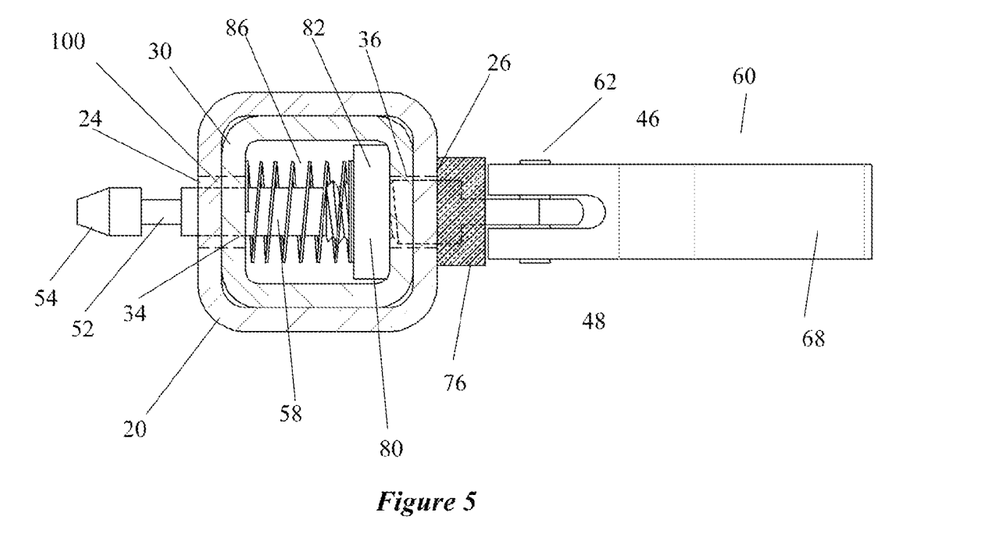
FIG. 5 is a cross-sectional view of the hitch pin securing system of FIG. 1 and FIG. 2.

Shank tube 30, as shown in FIGS. 1 and 5, includes a portion 32 having a shape similar to the shape of the internal portion 22 of receiver tube 20 and an external diameter slightly less than the internal diameter of the receiver tube 20. This enables the shank tube 30 to be inserted within the receiver tube 20 in a telescoping manner. In most typical receiver hitch assemblies, the difference in the dimensions of the internal portion 22 of the receiver tube 22 and the external portion 32 of the shank tube 30 is about {fraction (1/16)} inch (one-sixteenth inch) to allow the shank tube 30 to be easily inserted within the receiver tube 20. In the exemplary embodiment described herein, shank tube 30 is illustrated as having a trailer hitch ball mounted thereon. It is to be expressly understood that the claimed inventions also include shank tubes having carriers mounted thereon, such as bicycle carriers, ski carriers, cargo compartments, platforms and other types of receiver mounted devices.

As shown in FIG. 5, receiver tube 20 includes opposing side holes 24, 26. The shank tube also includes opposing side holes 34, 36 that align with the opposing side holes 24, 26 of the receiver tube 20 as the shank tube 30 is inserted into the receiver tube 20. Hitch pin assembly 40 is inserted through side holes 24, 26 of the receiver tube 20 and the side holes 34, 36 of the shank tube to secure the shank tube 30 to the receiver tube 20.

Figure 2:
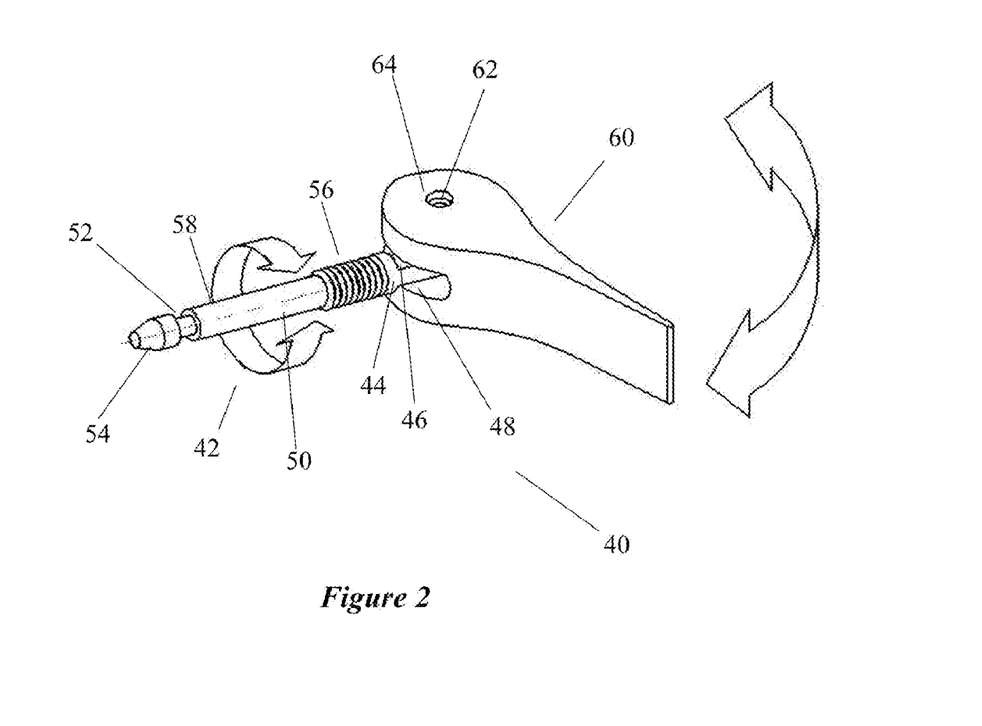
FIG. 2 is a perspective view of a preferred embodiment of the hitch pin securing system of the present invention.

In a preferred embodiment, hitch pin assembly 40 includes pin 42, shown in FIG. 2. Pin 42 includes a head portion 44 with reduced flat portions 46, 48, an elongated portion 50, a locking groove 52 and a tapered end 54. Elongated portion 50 includes a threaded section 56 and a reduced diameter portion 58. The threaded section 56 of elongated portion 50 is spaced a distance "d" from head portion 44. This distance "d" preferably equal to or less than the combined thicknesses of the side walls of the receiver tube 20 and the shank tube 30.

Figure 3:
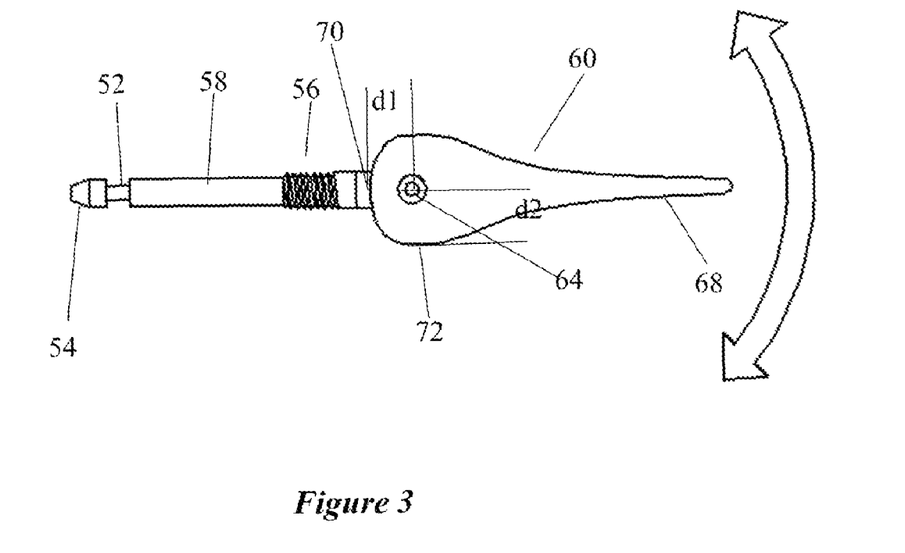
FIG. 3 is a side view of the embodiment of FIG. 2 in the unlocked position.
Figure 4:
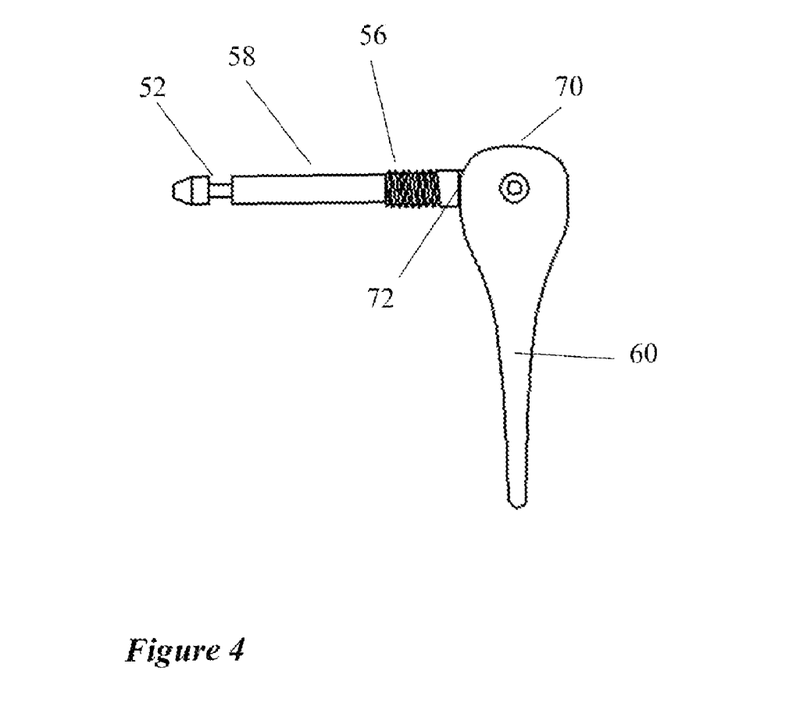
FIG. 4 is a side view of the embodiment of FIG. 2 in the locked position.

Locking handle 60 is pivotally mounted on the hitch pin 42 by pin 62 extending through hole 64 on the locking handle through a hole formed in the head portion 44 of the hitch pin 42. Slot 66 is formed in the locking handle 60 to fit over the reduced flat portions 46, 48 on the hitch pin. The locking handle 60 is thus able to rotate about the transverse axis of the hitch pin but does not rotate about the longitudinal axis of the hitch pin 42 as shown in FIGS. 2-4. The hole 64 on the locking handle is located slightly off center so that the distance d1 between the surface 70 and the hole 64 is less than the distance d2 between the surface 72 and hole 64 as shown in FIGS. 3 and 4. This creates a cam surface for cinching the hitch pin assembly tight as discussed in greater detail below. The end portion 68 of the locking handle 60 is reduced to create a handle surface for operating the locking handle.

The hitch pin assembly also includes a resilient member 76 that is mounted onto the hitch pin 42. In this preferred embodiment, the resilient member 76 is an elastomer spring, such as a polyurethane spring. It is to be expressly understood that other types of materials may be used as well. In this preferred embodiment, the resilient member 76 is mounted on the hitch pin 42 adjacent the locking handle 60 as shown in FIG. 5. The durometer of the resilient member can be selected in accordance with the need for more or less resilience, for the size of the member and for other reasons.

Hitch pin assembly 40 also includes spring nut assembly 80. Spring nut assembly 80 includes a square nut 82 having an internal threaded portion 84 for mating engagement with threaded section 56 of pin 42. The outer dimension of the square nut 82 is selected to prevent the nut from rotating within the internal portion of the shank tube 30 as discussed below. Compression spring 86 is attached to one side of nut 82. The compression spring 86 is sized so that it is in a state of compression when the spring nut assembly 80 is inserted within the shank tube 30 as discussed below.

Another component of hitch pin assembly 40 is lock 90. Lock 90 engages over the tapered end 54 of pin 42 and locks onto locking groove 52.

In use, spring nut assembly 80 is inserted within the internal cavity of shank tube 30. Spring 86 is compressed so that spring nut 80 is able to be easily inserted into shank tube 30. The spring nut is inserted into the shank tube 30 until the internal threaded portion 44 is aligned with side holes 34, 36 of the shank tube. Compression spring 86 resiliently presses between the inner side wall of the shank tube 30 and the nut 82 to maintain the alignment between the threaded portion 84 and the side holes 34, 36.

Figure 10:
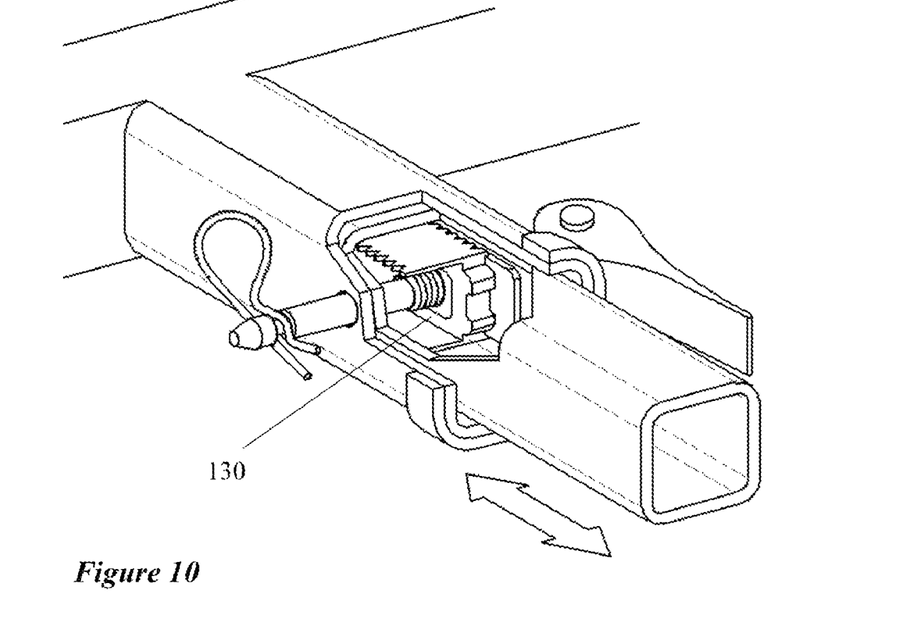
FIG. 10 is a different shank tube nut using the embodiment of FIG. 2.

It is to be expressly understood that while compression spring 86 is discussed in the exemplary embodiment for descriptive purposes, other resilient mechanisms can be used as well to maintain the alignment between the nut 80 and the side holes 34, 36. For example, an elastomer body could be used in lieu of the spring 86. Also, in another embodiment, nut 86 can be affixed either permanently or temporarily on the interior of the shank tube by welding, by adhesive or by other known mechanisms. Also, the side hole 34 could be threaded instead of using a separate nut. In another embodiment, an alignment member, such as a detent member, notch, or other member can be incorporated in either the nut or the shank tube to align the nut with the side holes. The spring nut assembly of the present invention also includes other shank tube nut alignment systems that align the nut within the shank tube, such as the nut tube holder 130 shown in FIG. 10.

Shank tube 30 is then ready for insertion into the receiver tube 20 once the spring nut assembly 80 has been installed within the shank tube 30. Shank tube 30 is "telescoped" within the receiver tube 20 until the side holes 34, 36 are aligned with the side holes 24, 26 of the receiver tube. Pin 42 is then inserted into the side holes 24, 34 until the threaded portion 56 of the pin 42 engages the threaded portion 84 of the spring nut assembly 60. Pin 42 is then rotated relative to the nut 82 to tighten the nut 82 against the inner side wall of the shank tube 30. The locking handle 60 in a vertical or partially vertical orientation is used to provide leverage to easily rotate the pin relative to the nut. The size of the nut 82 is selected to ensure that the nut cannot rotate within the shank tube 30. As the pin 42 continues to be rotated relative to nut 82, nut 82 exerts pressure against the inner side wall of the shank tube 30 which in turns clamps against the inner side wall of the receiver tube 20.

Once the pin and nut are snug against the shank tube and receiver tube, the locking handle is then rotated downward into a horizontal position so that surface 72 engages the resilient member 76. The increased distance d2 on the locking handle 60 exerts additional pressure on the resilient member 76 to further tighten the shank tube against the receiver tube so that relative movement between the shank tube 30 and the receiver tube 20 is minimized or even eliminated. Thus the rattling of the shank tube and associated trailer or carrier mounts is minimized. Wear between the shank tube and receiver tube is also minimized as well. The use of cam surface on the locking handle provides a secure locking mechanism without the need of wrenches or other tools that are often not available. The pressure can be reduced on the resilient member 76 by pivoting the locking handle upward and then simply rotating the handle and pin to remove the pin from the nut.

Lock 90 can then be secured and locked onto the end 54 of the pin assembly 40 to prevent unauthorized removal of the pin assembly 40 and the shank tube 30. In another preferred embodiment, pin 42 includes a groove to allow a clip pin to prevent the pin from loosening or being removed. Other types of securing mechanisms can be used as well to prevent the removal of pin 42 from the shank tube 30 and receiver tube 20.

In another alternative embodiment, bushing 100 can be provided to go over the elongated portion 46 of pin 42. Bushing 100 butts up against the shoulder of threaded portion 48 of the pin to ensure that the pin 42 fits tightly within the side holes 26 of the receiver tube and 36 of the shank tube. Also, the lock 90 will engage the bushing as well to ensure a tight fit between the components.

Figure 6:
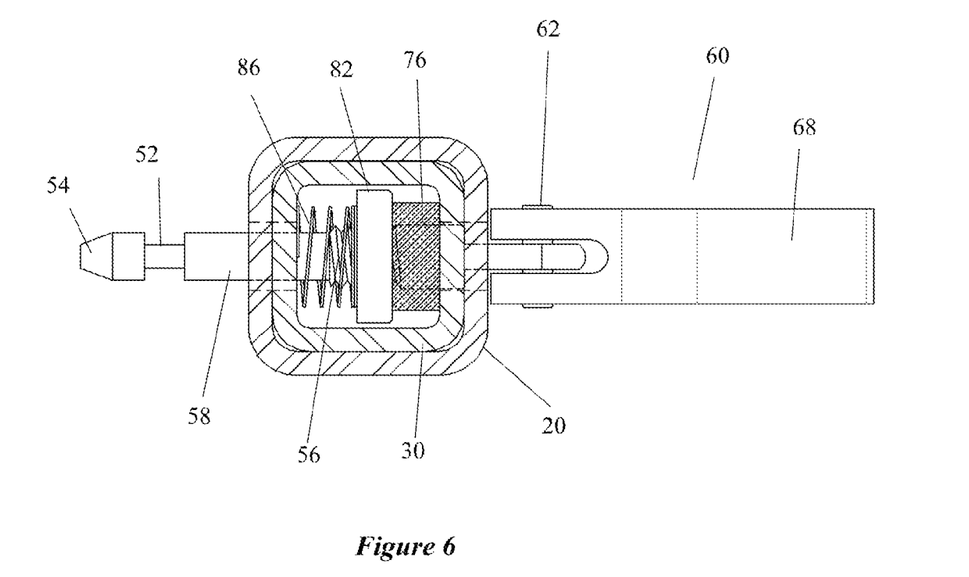
FIG. 6 is a cross-sectional view of a different mounting of the hitch pin securing system of FIG. 2.

In another preferred embodiment of the present invention, the resilient member 70 is inserted between the spring nut 82 and the inner surface of the shank tube as shown in FIG. 6. The hitch pin 42 is inserted through the side holes of the receiver tube and the shank tube and through the resilient member 76 where it engages the threaded portion of the nut 82. Once the hitch pin 42 and nut 82 are snug against the surfaces of the receiver tube and shank tube respectively, the locking handle 60 is rotated downward causing the cam surface 72 to engage the receiver tube to compress the nut 82 against the resilient member 76 to secure the shank tube against the receiver tube and minimize the rattling and movement of the shank tube relative to the receiver tube.

Figure 7:
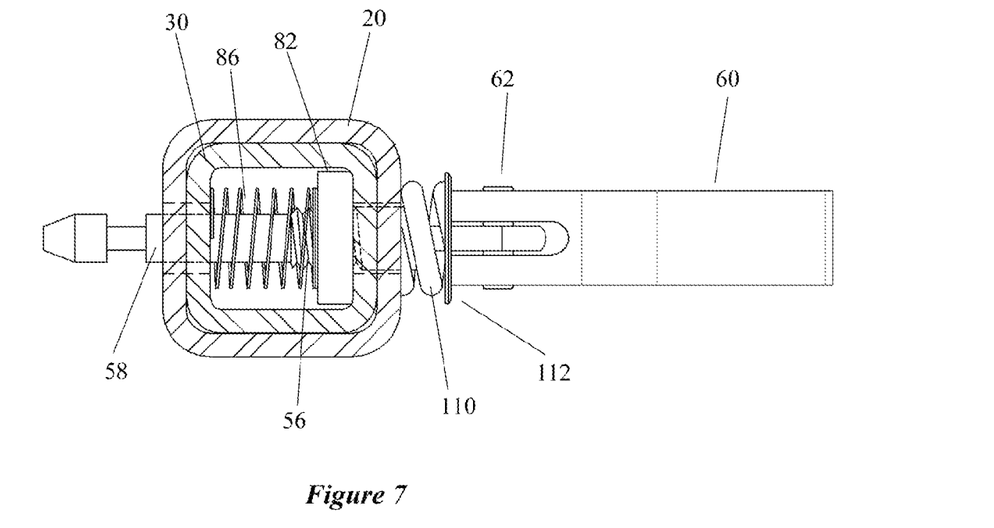
FIG. 7 is a cross-sectional view of an alternative embodiment of the hitch pin securing system of the present invention.

Another preferred embodiment of the present invention is illustrated in FIG. 7. This embodiment is similar to the above described embodiment except a coil spring 110 is used as the resilient member 76. A washer 112 is provided between the coil spring 110 and locking handle 60. The operation of this embodiment is identical to the earlier described embodiments. Once the hitch pin 42 is threaded into the nut 82 and the receiver tube and shank tube are snug against one another, the locking handle is rotated downward into a horizontal position. This causes the surface 72 to engage against the washer and coil spring to provide additional pressure between the receiver tube and shank tube to minimize movement between the receiver tube and shank tube.

Figure 8:
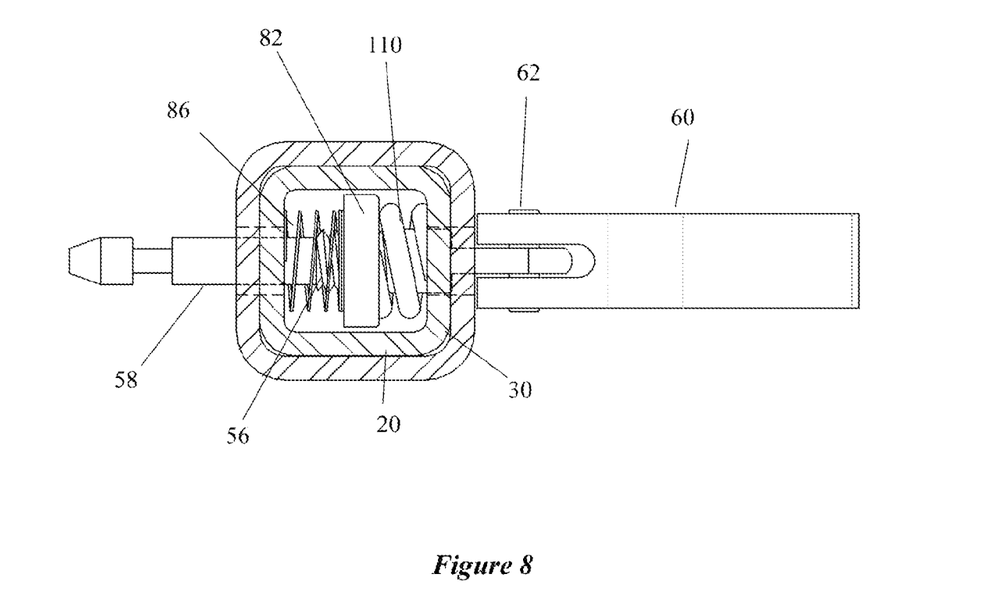
FIG. 8 is a cross-sectional view of a different mounting of the hitch pin securing system of FIG. 7.

Another preferred embodiment is illustrated in FIG. 8. This embodiment inserts the coil spring 110 between the nut 82 and the inner surface of the shank tube. Once the hitch pin 42 is threaded into the nut 82 and the receiver tube and shank tube are snug against one another, the locking handle is rotated downward into a horizontal position. This causes the surface 72 to engage against the receiver tube to provide additional pressure between the receiver tube and shank tube to minimize movement between the receiver tube and shank tube.

Figure 9:
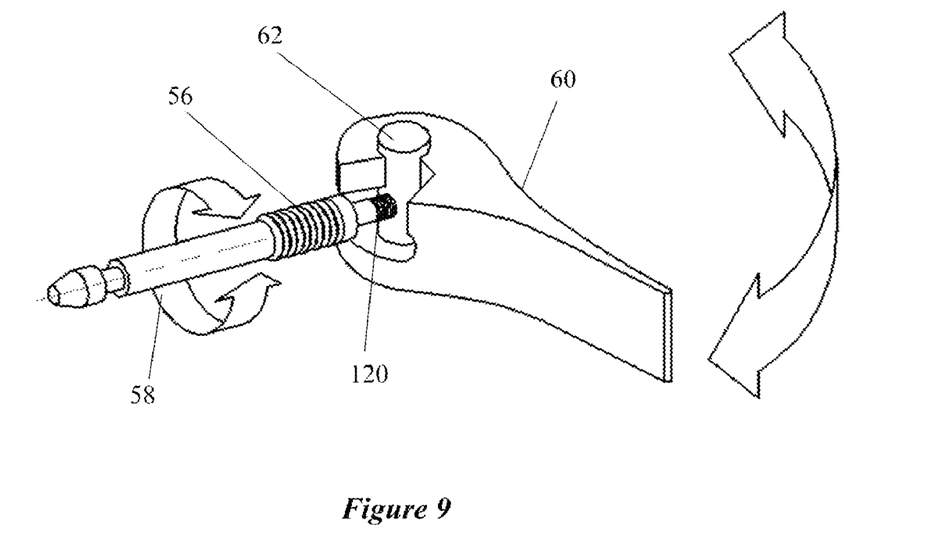
FIG. 9 is an alternative embodiment of the hitch pin securing system of the present invention.

Another preferred embodiment is illustrated in FIG. 9. This embodiment provides a fine threaded portion 120 on the hitch pin 42. This threaded portion engages in a threaded portion on pin 62. This allows a micro adjustment on spacing between the threaded portion 56 on hitch pin 42 and the locking handle 60. This adjustment allows adjustment for the necessary force between the resilient member 76 and the locking handle. Different receivers and shanks have different tolerances, thus an adjustment may be necessary in order to achieve a tight fit using the present invention.

The present invention, in another preferred embodiment, uses a hitch pin assembly similar to the above described embodiments. The nut 82 is embedded within an elastomer body that provides resilience as the locking handle is rotated downward. Alternatively, a threaded bushing embedded within an elastomer body may be used in lieu of the nut 82. The resilient member 76 is eliminated in these embodiments.

Another preferred embodiment of the present invention provides an elastomer portion on the cam surface 72 on the locking handle. This provides the resilience when the locking handle 60 is rotated downward so that resilient member 76 is not necessary.

Figure 11:
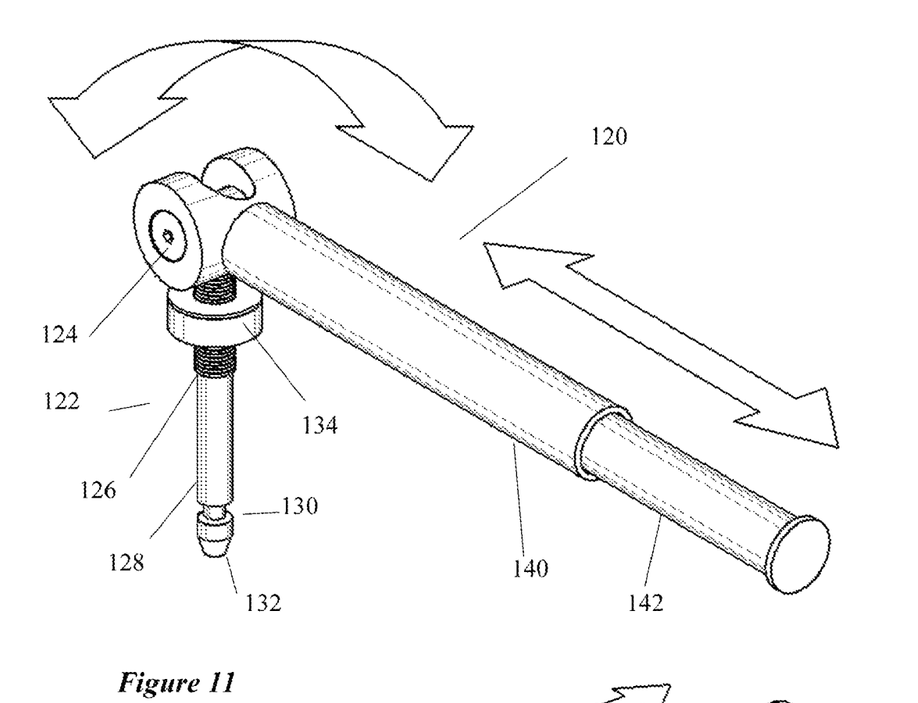
FIG. 11 is an alternative embodiment of the hitch pin securing system of the present invention.

The present invention in another preferred embodiment is illustrated in FIG. 11. This hitch pin assembly 120 is similar to the above described embodiments with a hitch pin 122 having a head portion 124, a threaded portion 126, a reduced diameter portion 128, a groove 130, a tapered end portion 132, resilient member 134 and a locking handle 140. The locking handle 140 includes a telescoping handle 142 that provides additional leverage if needed for tightening the pin in the nut 82 and for locking the handle downward. The handle can be telescoped together to reduce the length once the handle is in the locked horizontal position.

Figure 12:
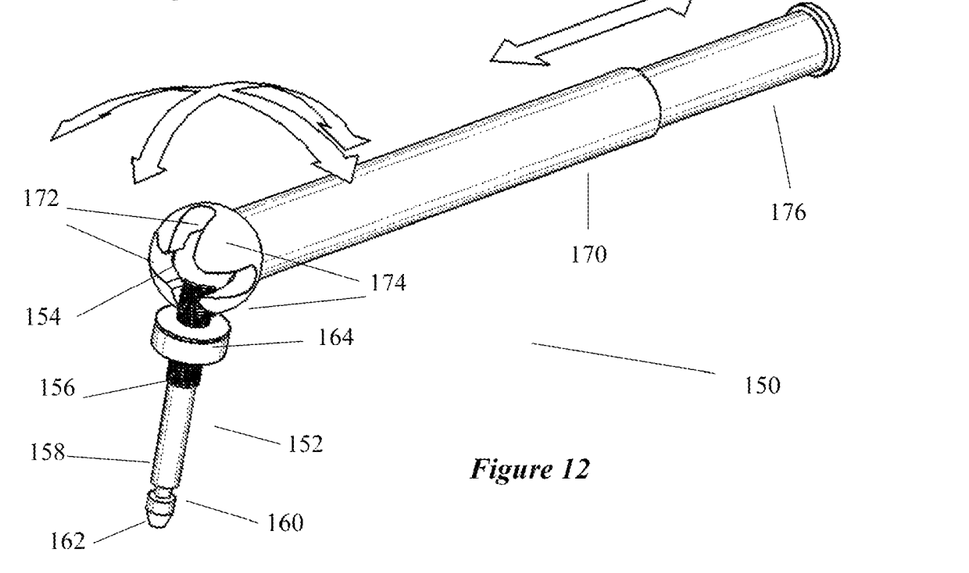
FIG. 12 is an alternative embodiment of the hitch pin securing system of the present invention.

Another preferred embodiment is illustrated in FIG. 12. This hitch pin assembly 150 is similar to the above described embodiments with a hitch pin 152, a head portion 154, a threaded portion 156, a reduced diameter portion 158, a groove 160, a tapered end portion 162, a resilient member 164 and a locking handle 170. The head portion 154 on this embodiment is spherical as shown in FIG. 11. The locking handle 170 includes a plurality of slots 172 with a concave inner portion that engages the spherical head portion 154. The handle 170 has a plurality of circular cam surfaces 174 as well. The handle 170 also includes a telescoping handle 176 for additional leverage. The spherical head portion and multiple cam surfaces 174 provide additional cam surfaces for engaging against the resilient member 164 or the receiver tube to tighten the shank tube against the receiver tube.

It is to be expressly understood that these exemplary embodiments are provided for descriptive purposes only and not meant to unduly limit the scope of the claimed inventions. Other embodiments are also considered to be within the scope of the present inventions that utilize a cam locking handle that provides a tightening mechanism for rotating the pin relative to the shank nut as well as for locking the shank tube against the receiver tube.

What is claimed is:

1. A hitch pin assembly for use with a receiver hitch assembly having a receiver tube with opposing side holes for receiving a hitch pin and a shank tube with opposing side holes for receiving a hitch pin, said hitch pin assembly comprises:

a threaded nut within the shank tube aligned with the opposing side holes;

an elongated pin;

a threaded portion on said elongated pin for engagement with said threaded nut;

a spherical head portion on said elongated pin;

a handle having a concave inner portion pivotally mounted on said spherical head potion;

a plurality of slots on said handle to selectively engage said elongated pin; and a cam surface on said handle so that as said handle is pivoted into a locking position relative to said elongated pin, said cam surface forces the shank tube into tight engagement against the receiver tube to minimize relative movement between the shank tube and the receiver tube.

2. The hitch pin assembly of claim 1 wherein said hitch pin assembly further includes:

a resilient member on said elongated pin to provide a resilient force against said cam surface.

3. The hitch pin assembly of claim 1 wherein said hitch pin assembly includes:

a resilient member on said elongated pin adjacent said threaded nut to provide a resilient force against said cam surface.

4. The hitch pin assembly of claim 1 wherein said cam surface includes:

a resilient portion to provide a resilient force against said threaded nut.

5. The hitch pin assembly of claim 1 wherein said hitch pin assembly further includes:

a threaded portion on said head portion that engages said handle to provide adjustment between said handle and said threaded portion on said elongated pin.

6. The hitch pin assembly of claim 1 wherein said hitch pin assembly further includes:

multiple cam surfaces on said handle.

* * * * *